United States Patent
Nielsen et al.

(10) Patent No.: US 12,209,820 B2
(45) Date of Patent: Jan. 28, 2025

(54) PLATE KIND HEAT EXCHANGER WITH LOCKING DEVICE

(71) Applicant: Danfoss A/S, Nordborg (DK)

(72) Inventors: Helge Nielsen, Sydals (DK); Henrik Agerley Thomsen, Kolding (DK)

(73) Assignee: DANFOSS A/S, Nordborg (DK)

( * ) Notice: Subject to any disclaimer, the term of this patent is extended or adjusted under 35 U.S.C. 154(b) by 89 days.

(21) Appl. No.: 17/459,193

(22) Filed: Aug. 27, 2021

(65) Prior Publication Data
US 2022/0065557 A1    Mar. 3, 2022

(30) Foreign Application Priority Data
Aug. 28, 2020 (DK) .............................. PA202070557

(51) Int. Cl.
*F28F 3/08* (2006.01)
*F28D 9/00* (2006.01)
*F16B 7/18* (2006.01)

(52) U.S. Cl.
CPC ............ *F28F 3/083* (2013.01); *F28D 9/0062* (2013.01); *F16B 7/187* (2013.01); *F28F 2280/04* (2013.01)

(58) Field of Classification Search
CPC ........ F28F 2280/04; F28F 3/083; F16B 7/187
See application file for complete search history.

(56) References Cited

U.S. PATENT DOCUMENTS

| | | | | |
|---|---|---|---|---|
| 2,636,533 A | * | 4/1953 | Tinnerman | F16B 37/044 411/107 |
| 3,646,982 A | * | 3/1972 | Cushman | F16B 37/14 411/965 |
| 5,462,112 A | * | 10/1995 | Johansson | F28F 3/083 165/167 |
| 6,973,960 B1 | * | 12/2005 | Seidel | F28F 3/083 165/166 |
| 2009/0095457 A1 | * | 4/2009 | Nyander | F28F 9/0075 165/167 |

(Continued)

FOREIGN PATENT DOCUMENTS

| | | | | |
|---|---|---|---|---|
| CN | 1293750 A | * | 5/2001 | ............. F28F 3/083 |
| CN | 103282736 A | | 9/2013 | |

(Continued)

OTHER PUBLICATIONS

Translation of Chinese Patent Document CN1293750A entitled Translation—CN1293750A (Year: 2023).*

(Continued)

*Primary Examiner* — Paul Alvare
(74) *Attorney, Agent, or Firm* — McCormick, Paulding & Huber PLLC

(57) ABSTRACT

The present invention introduces a heat exchanger including a stack of heat transfer plates positioned between two end plates in which recesses formed in edge regions are adapted to accommodate bolts reaching from a first to a second of said two end plates, said at least one of said recesses formed with locking features adapted to engage with a locking device including an opening, where the locking device is to be positioned on the respective end plate with the opening aligned with the recess in such a manner that a bolt positioned in the recess also can project through said opening. This prevents the bold from falling out of the recesses.

7 Claims, 4 Drawing Sheets

(56) References Cited

U.S. PATENT DOCUMENTS

| | | | | |
|---|---|---|---|---|
| 2011/0220334 A1* | 9/2011 | Olsson | .................. | F28F 9/0256 165/167 |
| 2011/0240273 A1* | 10/2011 | Blomgren | ................ | F28F 3/083 165/168 |
| 2013/0284412 A1* | 10/2013 | Forstenius | ............ | F28F 9/0075 165/166 |
| 2015/0247682 A1* | 9/2015 | Nilsson | .................. | F28D 9/005 165/185 |
| 2017/0016683 A1* | 1/2017 | Cecil, Jr. | .................. | F28F 3/083 |

FOREIGN PATENT DOCUMENTS

| | | | | |
|---|---|---|---|---|
| CN | 103512419 A | | 1/2014 | |
| CN | 103016500 B | | 12/2014 | |
| CN | 205878987 U | * | 1/2017 | |
| EP | 2 474 804 A1 | | 7/2012 | |
| EP | 2 672 214 A1 | | 12/2013 | |
| EP | 3399270 A1 | * | 11/2018 | ............. F28D 9/005 |
| GB | 163229 A | | 5/1921 | |
| GB | 1553405 A | * | 9/1979 | ............. F28F 3/083 |
| GB | 1553406 A | * | 9/1979 | ............. F28F 3/083 |
| JP | H04-100665 U | | 8/1992 | |
| KR | 100622116 B1 | * | 8/2005 | |
| KR | 622116 B1 | * | 9/2006 | ............. F28D 9/00 |
| RU | 2469252 C1 | | 12/2012 | |
| RU | 2472091 C1 | | 1/2013 | |
| SU | 561440 A1 | | 2/1986 | |
| WO | 93/08438 A1 | | 4/1993 | |
| WO | WO-2014204385 A1 | * | 12/2014 | ............ F16B 37/044 |

OTHER PUBLICATIONS

Translation of Chinese Patent Document CN205878987U named Translation—CN205878987U (Year: 2017).*

Translation of KR100622116B1 named Translation—KR100622116B1 (Year: 2005).*

Extended European Search Report for European Patent Application No. 21193714.9 dated Jan. 13, 2022.

* cited by examiner

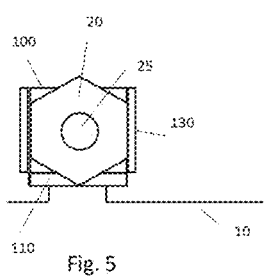
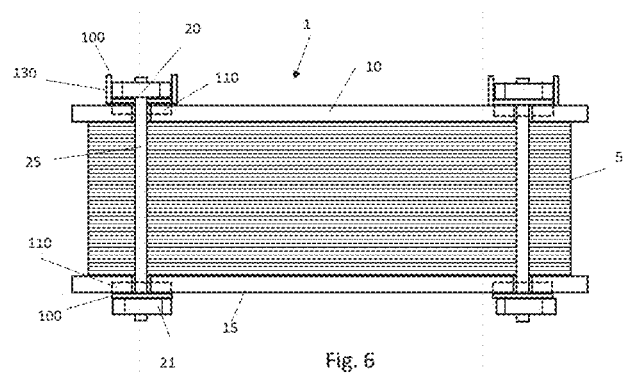

PLATE KIND HEAT EXCHANGER WITH LOCKING DEVICE

CROSS-REFERENCE TO RELATED APPLICATION

This application claims foreign priority benefits under 35 U.S.C. § 119 to Danish Patent Application No. PA202070557 filed on Aug. 28, 2020, the content of which is hereby incorporated by reference in its entirety.

TECHNICAL FIELD

This application relates to plate heat exchangers.

BACKGROUND

A typical construction of a plate heat exchanger comprises a plurality of heat transfer plate stacked on top of each other. The heat transfer plates are formed with patterns such that flow paths are formed between each set of neighboring heat transfer plates. Openings and are formed in the heat transfer plates defining inlets and outlets for fluids to these flow paths. Some heat exchangers have the plates brazed together, whereas in others heat exchangers gaskets are positioned between the heat transfer plates in gasket grooves formed in the heat transfer plates. The gasket then is arranged at an edge portion of the heat transfer plate to seal the flow paths and at an area around the openings to seal pairs of the openings, such that only two of them have flow access to the flow path formed at one side of the heat transfer plate, while the other two is sealed therefrom.

Frame plates, or end plates, having a significant thickness compared to the heat transfer plates to take up great loads are connected and fastened to the stack of heat exchangers plates, such as at the top and bottom.

Such end plates may be held together by bolts inserted into recesses formed in edge portions and tightened by a nut screwed at the one end of the bolt, or one at either side. The problem is that such bolts tend to drop out of the recesses, e.g. during handling of the heat exchanger.

SUMMARY

The present invention solves the problem by the features as given in the claims.

This includes introducing a heat exchanger comprising a stack of heat transfer plates positioned between two end plates in which recesses formed in edge regions are adapted to accommodate bolts reaching from a first to a second of said two end plates, said at least one of said recesses formed with locking features adapted to engage with a locking device comprising an opening, where the locking device is to be positioned on the respective end plate with the opening aligned with the recess in such a manner that a bolt positioned in the recess also can project through said opening.

The locking device may be formed with a locking section adapted to match with the locking feature.

The locking device may comprise a main section formed with said opening and adapted to rest on the surface of said end plate, and the locking section projecting with an angle from said main section such that when in position it fits into said locking feature.

The locking device may further be formed with engaging sections projecting in an opposite direction relative the locking section adapted to engage with a polygonal end section of the bolt resting on the surface of the main section preventing it from rotation relative to the heat exchanger. In an embodiment the polygonal end section is a nut winded onto the bolt.

The locking feature may be one or more locking recesses formed in the edge of the recess, forming a first kind locking recess.

The locking feature may be one or more locking openings formed at the side(s) of the recess, forming a second kind locking recess.

In an embodiment, a first kind locking device is positioned in connection with a first end plate, and a second kind locking devices positioned in connection with a second end plate, and where a bolt is positioned in a recess of respectively the first and second end plate and projecting trough the openings of respectively the first and second kind locking devices, where tightening means is winded onto the bolt at the end of the first kind locking device resting on its main section.

In an embodiment the recess (comprises a first asymmetry formed as a second side section curving more than the first side section, such that the width A of an upper section of the recess is wider than the width B just above the positioning of the locking features.

In an embodiment the recess comprises a second asymmetry, where the second side of the lower section of the recess has a larger width C than the width B and is positioned asymmetric thereto.

The present invention further relate to a locking device to be used in connection with a heat exchanger comprising a stack of heat transfer plates positioned between two end plates, wherein said locking device comprises a main section adapted to be positioned on the surface of an end plate and is formed with a locking section projecting with an angel relative to the main portion and adapted to match with a locking feature in said end plate.

In an embodiment, the locking device is formed with engaging sections projecting in an opposite direction relative the locking section adapted to engage with a polygonal end section of a bolt resting on the surface of the main section preventing it from rotation relative to the heat exchanger.

The present invention further relate to a method to assemble a heat exchanger comprising a stack of heat transfer plates positioned between a first and second end plate each having at least one recesses formed in an edge region, said method being to for locking devices each comprising a main section formed with an opening and a locking section to be positioned with the main section resting on the surface of said end plate) with the opening aligned with the respective end plate recess and the locking section engaging a locking feature of the respective end plate, and positioning a bolt through the aligned openings and recesses of respectively the first and second end plate, said bolt having a polygonal end section positioned on the main section of the first end plate.

A locking device of a second kind may be positioned on one of the first or second end plates which further is formed with engaging sections projecting in an opposite direction relative the locking section adapted to engage with said polygonal end section of a bolt preventing it from rotation relative to the heat exchanger, and further tightening the first and second end plates together by winding tightening means on the second of the end plates until it rests tightly on the surface of the positioned locking device being of a first kind without engaging sections.

BRIEF DESCRIPTION OF THE DRAWINGS

FIG. 5 Top view of a second kind locking device installed in a recess in the edge of an end plate.

FIG. 6 Side view of a second kind locking device installed in a recess in the edge of an end plate.

DETAILED DESCRIPTION

It should be understood, that the detailed description and specific examples, while indicating embodiments of the invention, are given by way of illustration only, since various changes and modifications within the spirit and scope of the invention will become apparent to those skilled in the art from the detailed description.

Figure 1:
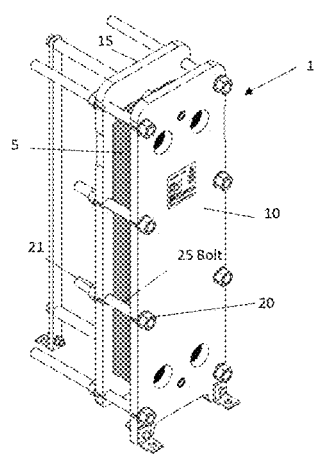
FIG. 1 Illustration of a plate kind heat exchanger held together by end plates and bolts.

FIG. 1 illustrates one embodiment heat exchanger (1) where a stack of patterned heat transfer plates (5) is positioned between the first end plate (10) and second end plate (15). Not illustrated gaskets or sealings in general are positioned at the edge portions between any two of the connected heat transfer plates (5), such that sealed fluid paths are formed. Since they are not fixed, they are held together by the external forces of squeezing the end plates (10, 15) slightly towards each other. To this end recesses (150) are formed in edge regions adapted to accommodate bolts (25) reaching from a first (10) to a second (15) of the two end plates. At one end the bolt is engage with a polygonal end section (20) which may be an integrally formed part of the bolt (25), such as a bolt head, or may be a nut (20) winded onto a winded end section of the bolt (25).

At the second end of the bolt (25) it is adapted to receive tightening means (21), which too could be a nut (21) screwed to windings at the end of the bolt (25). As illustrated in FIG. 1 the bolt extend from the first end plate (10) to the second end plate (15), and the polygonal end section (20) and tightening means (21) is positioned at the outer end plate (10, 15) surfaces relative to the plate stack (5), such that through the tightening means (21) the two end plates (10, 15) are being squeezed closer together to keep the individual heat transfer plates close together. As indicated, this could be by screwing a nut (21) tighter onto the bolt (25).

Figure 2:
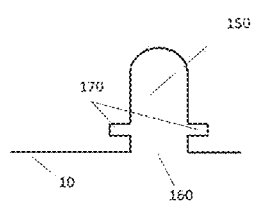
FIG. 2 Illustration of recess formed in the edge of an end plate according to a first embodiment of the present invention.

An embodiment recess (150) formed in the edge portion of the end plates (10, 15) is illustrated in FIG. 2. The recess (150) is seen to be open (160) at the edge enabling an easy introduction of the bolt (25) from the sides. This however have the disadvantage that the bolts during handling or operation of the heat exchanger (1) simply may drop out of the recess (150). To solve this problem the end plates (10, 15) are formed with locking features (170). In the illustrated embodiment the locking features (170) is two sub-recesses formed in the side of the recess (150) in parallel to the edge of the end plate (10, 15). Alternatively, they e.g. could be openings formed in the vicinity of the recess (150).

Figures 3A, 3B, 3C:
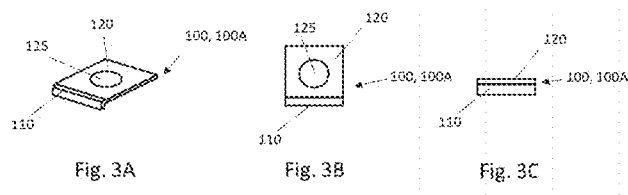
FIGS. 3A-3C Illustration of a first kind locking device according to an embodiment of the present invention.
Figures 4A, 4B, 4C:
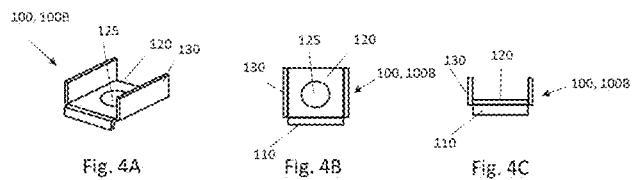
FIGS. 4A-4C Illustration of a second kind locking device according to an embodiment of the present invention.

The locking features (170) are adapted to operate with locking sections (110) of locking devices (100) to be used in connection with the bolts (25). An embodiment first kind locking device (100A) is illustrated in FIGS. 3A-C and a second kind locking device (100B) is illustrated in FIGS. 4A-C.

Illustrated in both the first kind locking device (100A) and second kind locking device (100B) is a locking section (110), which in the illustrated embodiment is a bend down section relative to the main section (120). This is adapted to engage with the locking features (170) of the end plates (10, 15), such as formed as recesses or openings/holes. If the locking features (170) are formed as a plural of individual openings, then the locking section (110) preferably would be formed of a similar number of individual parts each adapted to engage with such an opening.

Further seen in both kinds (100, 100A, 100B) is the main section (120) comprising an opening (125) for a bolt (25).

The locking device (100, 100A, 100B) operates together with the recess (150), locking features (170) and bolt (25) in a manner where a bolt (25) reaching from the recess (150) of the first end plate (10) to the recess (170) of the second end plate (15) is mounted with respectively the first and second ends reaching through the two openings (125) of the respective locking features (100, 100A, 100B), which is positioned with the locking feature (170) engaging with the locking features (170) preventing any dislocation of the bolt (25), and locking features locking features (100, 100A, 100B), but rather keeps the features in position.

In an embodiment the locking feature (170) is positioned such, that the inserted bolt (25) will be hold firmly in the recess (150).

The parts (25, 100, 100A, 100B) further is being fixed such as with a tightening means (20), like a nut being winded onto winded section at the one ends of the bolt (25) till the end plates (10, 15) are slightly squeezed towards each other. This ensures a firm and stable connection and fixation of the heat exchanger (1). At the second end a polygonal end section (20), which in one embodiment too is a nut winded on the second outer end section of the bolt (25), or in an alternative embodiment a head forming part of the bolt (25)

A remaining problem is preventing the bolt (25) from rotation, both during installation, but also during operation.

The second kind locking feature (100B) as illustrated in FIGS. 4A-C showing engaging sections (130), in the illustrated embodiment formed as wall parts (130) connected to the main section (120) bend in the direction opposite to the locking section (110). The engaging sections (130) are adapted to engage with sides of the polygonal shaped end section (20) when positioned on the main section (120) preventing it from rotation.

In this manner, e.g. tightening means (21) in the form of a nut, can be winded towards the main section (120) of the associated locking device (100A) without having to use an additional tool acting on the polygonal end section (20).

The polygonal end section (20) could have any shape, such as squared, hexagonal or octagonal.

The assembly is done, possible attach the locking devices (100, 100A, 100B), tightening means (21) and optionally polygonal end section (20) loosely to the bolt (25). Introducing the whole assembly by the open edges (160) of the recesses (150) and position the locking devices (100, 100A, 100B) on the surfaces of the first (10) and second (15) end plates with their locking sections (110) positioned in the locking features (170). Fixing the parts by the tightening means (21).

In one embodiment a first kind (100A) locking device is positioned at a first end of the bolt (25), and a second kind (100B) locking device at the second end. The second kind (100B) locking device then is positioned at the end of the polygonal end section (20). The assembly then further introduces the step of positioning the polygonal end section (20) in contact with the engaging sections (130), preventing it from rotation.

FIG. 5 is a top view illustration of a polygonal end section (20) positioned in a second kind (100B) locking device with walls in contact with the engaging sections (130) preventing rotation.

FIG. 6 is a side view of the heat exchanger (1) with the bolts (25) installed according to the embodiment where the polygonal end section (20) is positioned in the second kind (100B) locking device positioned at the upper first end plate (10), and the tightening means (21) positioned at a first kind (100A) locking device positioned at the second end plate (15) at the bottom. The first kind (100A) locking device being formed without any protruding walls like the engaging sections (130) to enable a tool operating on the tightening means (21) when tightening it. The locking features (110) are illustrated positioned into the locking features (170) in the end plates (10, 15).

Figure 7:
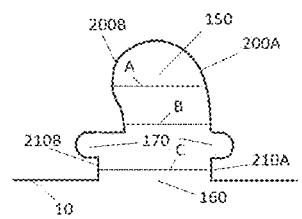
FIG. 7 Illustration of recess formed in the edge of an end plate according to a second embodiment of the present invention.

FIG. 7 is an alternative embodiment of the recess (150) formed in the edge portion of the end plates (10, 15). In one embodiment of the illustration, the recess comprises a first asymmetry formed as a second side section (200B) curving more than the first side section (200A), such that the width A of an upper section of the recess (150) is wider than the width B just above the positioning of the locking features (170). The term 'upper' is seen in relation to the edge of the end plate (10, 15) comprising the recess (150), just as 'lower' refers to the section close the edge of the respective end plate (10, 15). This asymmetric form assists the bolt from dropping out when the locking device (100, 100A, 100B) is not in positioned and engaged in the locking features (170).

In a further embodiment, the recess (150) comprises a second asymmetry, where the second side (210B) of the lower section of the recess (150) has a larger width C than the width B and is positioned asymmetric thereto.

In a further asymmetric embodiment, the recess (150) as illustrated includes both the first and second asymmetries.

In a further embodiment is illustrated that could be implemented in any previously disclosed embodiments, the locking features (170) is formed with rounded endings, rather than squared ones, which improves strength.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A heat exchanger comprising a stack of heat transfer plates positioned between two end plates in which recesses formed in edge regions are adapted to accommodate bolts reaching from a first to a second of said two end plates, at least one of said recesses formed with locking features adapted to engage with a locking device comprising an opening, where the locking device is to be positioned on the respective end plate with the opening aligned with the recess in such a manner that a bolt of the bolts positioned in the recess also can project through said opening, wherein the locking feature is one or more locking recesses formed in the edge of the recess, wherein said locking device is formed with a locking section adapted to match with the locking feature and wherein said locking device comprises a main section formed with said opening and adapted to rest on the surface of said end plate, and the locking section projecting with an angle from said main section such that when in position it fits into said locking feature, wherein the locking device further is formed with engaging sections projecting in an opposite direction relative the locking section adapted to engage with a polygonal end section of the bolt resting on a surface of the main section preventing the bolt from rotation relative to the heat exchanger, wherein the engaging sections extend away from an end plate of the two endplates and extend from the main section of the locking device, and wherein the recess comprises a first asymmetry formed as a second side section curving more than a first side section, such that a width (A) of an upper section of the recess is wider than a width (B) above the positioning of the locking features.

2. The heat exchanger according to claim 1, wherein the polygonal end section is a nut winded onto the bolt.

3. The heat exchanger according to claim 1, further comprising a locking device is a first kind comprising an opening and being positioned in connection with the first end plate, where the locking device formed with the engaging sections is a second kind and being positioned in connection with the second end plate, where the bolt is positioned in a recess of respectively the first and second end plate and projecting trough the openings of respectively the first and second kind locking devices, and where tightening means is winded onto the bolt at the end of the first kind locking device resting on its main section.

4. The heat exchanger according to claim 1, wherein the recess comprises a second asymmetry, where a second side of a lower section of the recess has a larger width (C) than a width (B) and is positioned asymmetric thereto.

5. A method to assemble a heat exchanger comprising a stack of heat transfer plates positioned between a first and second end plate each having at least one recesses formed in an edge region, said method being for locking devices each comprising a main section formed with an opening and a locking section to be positioned with the main section resting on the surface of said end plate with the opening aligned with the respective end plate recess and the locking section engaging a locking feature in the form of one or more locking recesses formed in the edge of the recess of the respective end plate, and positioning a bolt through the aligned openings and recesses of respectively the first and second end plate, said bolt having a polygonal end section positioned on the main section of the first end plate, wherein the locking device of a second kind positioned on one of the first or second end plates which further is formed with engaging sections projecting in an opposite direction relative the locking section adapted to engage with said polygonal end section of a bolt preventing it from rotation relative to the heat exchanger, and further tightening the first and second end plates together by winding tightening means on the second of the end plates until it rests tightly on the surface of the positioned locking device being of a first kind without engaging sections, wherein the engaging sections extend away from one of the first and second end plates and extend from the main section of the locking device, wherein the recess comprises a first asymmetry formed as a second side section curving more than a first side section, such that a width (A) of an upper section of the recess is wider than a width (B) above the positioning of the locking features.

6. A heat exchanger comprising a stack of heat transfer plates positioned between two end plates in which recesses formed in edge regions are adapted to accommodate bolts reaching from a first to a second of said two end plates, at least one of said recesses formed with locking features adapted to engage with a locking device comprising an opening, where the locking device is to be positioned on the respective end plate with the opening aligned with the recess in such a manner that a bolt of the bolts positioned in the recess also can project through said opening, wherein the locking feature is one or more locking recesses formed in the edge of the recess, wherein said locking device is formed with a locking section adapted to match with the locking feature and wherein said locking device comprises a main section formed with said opening and adapted to rest on the surface of said end plate, and the locking section projecting with an angle from said main section such that when in position it fits into said locking feature, wherein the recess comprises a first asymmetry formed as a second side section curving more than a first side section, such that a width (A) of an upper section of the recess is wider than a width (B) above the positioning of the locking features.

7. The heat exchanger according to claim 6, wherein the recess comprises a second asymmetry, where a second side of a lower section of the recess has a larger width (C) than a width (B) and is positioned asymmetric thereto.

* * * * *